Sept. 16, 1969 E. M. BOLOTIN ET AL 3,467,438
LOADING DEVICE
Filed March 1, 1967
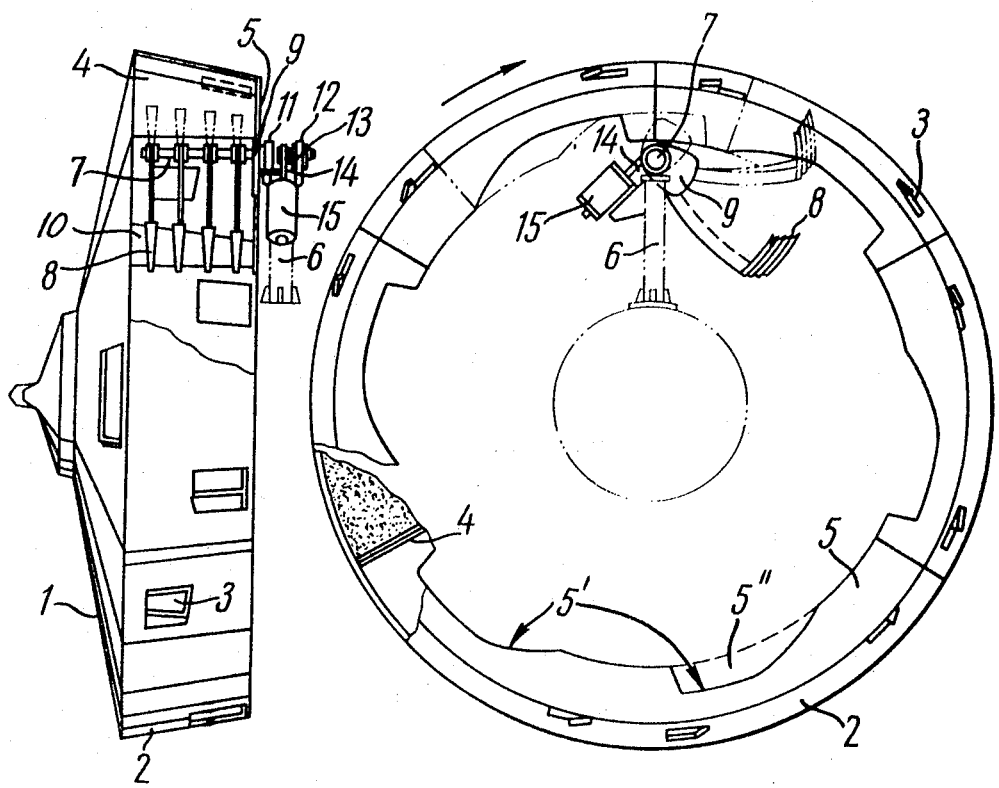
FIG.1 .  FIG.2
E. M. Bolotin et al. INVENTOR
BY Glascock, Downing & Seebold
ATTORNEY 3,467,438
LOADING DEVICE
Evgeny Moiseevich Bolotin, Otkrytoe shosse 24, korp. 25, kv. 12; Lev Abramovich Blyakher, Posledny per. 1/22, kv. 6; Boris Nikolaevich Ierusalimsky, Otkrytoe shosse 24, korp. 5–a, kv. 45; Leonid Ivanovich Saveliev, Otkrytoe shosse 29, korp. 11, kv. 58; Vladimir Ivanovitch Razmerov, Leningradsky prospekt 62, kv. 90; and Leonid Konstantinovich Khaidurov, Otkrytoe shosse 24, korp. 5–6, kv. 31, all of Moscow, U.S.S.R.
Filed Mar. 1, 1967, Ser. No. 619,791
Int. Cl. E21c 1/14
U.S. Cl. 299—33     5 Claims

ABSTRACT OF THE DISCLOSURE

A loading device for and a mechanized drifting shield having a rotary working member, the device comprising a rearwardly extending drum about the periphery of the working member, and traps in the lateral walls of the drum to permit the material cut by the working member to enter into the drum. Furthermore, there are support means within the drum upon which is mounted a rabble and also camming means which coacts with the drum such that as the drum rotates relative to the rabble, the camming means causes the rabble to oscillate in a predetermined sequence towards and away from the inner wall of the drum.

---

The present invention relates to devices employed in mechanized drifting shields for loading ground.

Known in the art are mechanized drifting shields for the underground mining, comprising a working member of rotary type, disposed in the front part of the shield and provided with a ground collector made usually as a drum which is mounted in the rear part of the working member, and has a ground trap in the lateral wall thereof and partitions arranged radially inside said drum on the inner surface of said wall, which serve for transferring the ground fed in the drum, into a bin located inside the drum or directly onto a belt conveyer.

When mining sticky ground, such as, muddy clay grounds or loamy soil, the sticky ground can sometimes settle in the collector drum so densely that it considerably reduces the transporting capacity of the shield.

An object of the present invention is to eliminate said disadvantages.

The principal object of the invention is to provide an effective means for removing ground stuck to the drum of the loading device to maintain the boring capacity and throughput of the shield at the required level when transporting the ground mined by the working member.

According to the invention, the means for removing the ground stuck on the inner surface of the drum of the ground collector is essentially a mechanism which is kinematically connected to the drum and provided with a rabble fixed on the shaft and capable of performing oscillating motions from the drum center towards the lateral wall thereof and vice versa when the working member is rotating.

In a preferable embodiment of the invention, the kinematic connection of the mechanism for removing the stuck ground out of the drum should preferably be made by disposing plates with shaped inner edges on the rear end of the drum, and a rabble or cam on its shaft, which will engage with the inner edges of these plates and slide along them when the working member is rotating, thereby causing the rabble to deviate towards the drum center.

To impart the oscillating motion to the rabble in the opposite direction (towards the side wall of the drum), the shaft carrying the blade and cam has a winding drum with a rod secured thereto with its one end, whereas another end of said rod is attached to a spring stretching, when the rabble deviates towards the drum center to bring the rabble back towards the drum side wall.

The invention may be made more fully apparent from a consideration of the following description of an exemplary embodiment thereof, taken in conjunction with the accompanying drawings, in which:

FIG. 1 represents a side view partially cut away of a working member of the shield complete with a loading device provided with a mechanism for removing the stuck ground; and FIG. 2 represents a rear view partially cut away of a loading device with different positions of the rabble of the mechanism for removing the stuck ground.

A working member 1 serves for excavating ground in the process of mining; on its rear side there is provided a device for loading ground, which consists of a ground collector made as a drum 2 provided with ground traps 3 (FIGS. 1 and 2) in its lateral wall, and with partitions 4 disposed radially on the inner side of said lateral wall.

The partitions 4 are made as lamellar ribs and serve to preclude a circular displacement of the ground fed into the drum 2 during the rotation of the working member 1.

Furthermore, in order to prevent the ground which is supplied into the drum 2 from falling back, plates 5 are disposed along the circumference of the rear end of the drum 2 which have shaped inner edges 5', 5" ensuring the operation of the mechanism for removing the stuck ground.

The mechanism for removing the stuck ground is mounted on a supporting stand 6 carrying a shaft 7 which is disposed in parallel relationship with the longitudinal axis of the shield and enters the drum 2. Fixed on the shaft 7 is a rabble 8 and a cam 9 engaging with the edges 5', 5" of the plates 5 and sliding along them when the working member 1 is rotating, thereby providing the kinematic connection of the drum 2 with the mechanism for removing the stuck ground.

The rabble 8 consists of a plurality of teeth disposed in parallel in conformity with the width of the drum 2. To keep the preset distances between teeth use is made of cross bracings 10.

The shaft of the mechanism for removing the stuck ground rests on bearings 11 and 12 of the supporting stand 6. Mounted on the supported end of the shaft 7 is a winding drum 13 having a flexible rod (steel cable) 14 attached to it. The flexible rod (steel cable) in turn is connected to a spring inserted into cylinder 15 so as to permit elastic movement of the steel cable 14.

In such a manner the rabble 8, the cam 9 and the winding drum 13 are fixed on the shaft 7 and are rotated together with it. The winding drum 13, the cylinder 15 with the spring and the cable 14 together form a spring motor.

The mechanism for removing the stuck ground designed and arranged in the manner mentioned above, is disposed in such a way that it will not repeat the rotary motion of the working member 1, but will repeat only the translation thereof.

In the above design, the cam 9 slides along the shaped edges 5', 5" of the plates 5 in conformity with the rotary motion of the working member 1 which takes place clockwise as viewed from the rear part of the loading device (FIG. 2).

Edges 5" are cut-out portions with a rather abrupt profile, but thanks to spring cylinder 15 and steel cable 14 which biases cam 9 against the camming action, shaft 7 rotates in accordance with the profile of plates 5.

The operation of cam 9 is further explained in FIG. 2 with a solid line; the cam 9 slides along the edges 5' and is cammed as shown by the solid lines, and accordingly the rabble 8 deviates towards the center of drum 2. When the working member turns into a position shown in FIG. 2 with a dotted line, the cam 9 slides along the edges 5″ of the plates and the rabble 8 with its teeth approach the lateral wall of the drum and removes the stuck ground therefrom. By choosing suitable distances between the partitions 4, the cut-out portions 5″, and the appropriate shape and dimensions of the cam 9, it is possible to make the teeth of the rabble 8 approach the surfaces of the partitions 4 so as to remove the ground therefrom.

Thus, the oscillating motions of the rabble 8 towards the center of the drum 8 are brought about due to the shaped edge 5′ contacting the cam 9, whereas the motion of the rabble 8 towards the lateral wall is accomplished by the spring cylinder 15 and cable 14.

Due to the above design, the present invention completely removes the sticky ground from the inner surface of the drum 2, thereby facilitating the operation of the working member 1, increasing the overall efficiency of mining and making it possible for the mechanized drifting shield to fully display its productive capacity.

We claim:

1. A loading device for a mechanized drifting shield having a rotary working member, said device comprising a drum attached about the periphery of said rotary working member and extending opposite the direction of cutting; traps for the material cut by said working member in the lateral walls of said drum; support means within said drum upon which is mounted at least one rabble for removing cut material stuck around the inner surface of said drum; and camming means on said drum in operative engagement with said rabble such that as said drum rotates relative to said rabble said camming means causes said rabble to oscillate in a predetermined sequence towards and away from said inner wall.

2. A loading device as claimed in claim 1 wherein said drum has camming surfaces extending radially inwardly; said rabble is mounted on a rotatable shaft which in turn is mounted on said support means; and a cam is also mounted on said shaft, which cam cooperates with said camming surfaces to cause the predetermined oscillation of said rabble.

3. A loading device as claimed in claim 2 further comprising biasing means for maintaining said cam on said camming surface.

4. A loading device as claimed in claim 3 wherein said biasing device includes a winding drum fixed to said shaft, a spring cylinder and a cable connecting said spring cylinder to said winding drum such that said spring cylinder tensions said cable which in turn exerts a rotary force on said winding drum which urges said rabble toward said inner wall.

5. A loading device as claimed in claim 2 further comprising inwardly directed radial partitions arcuately spaced about said inner wall; said camming surfaces and cam co-acting so as to oscillate said rabble into and out of the pockets formed on said inner wall by said partitions to remove the cut material lodged therein.

References Cited

UNITED STATES PATENTS 1,362,056   12/1920   Straight _____ 37—190

FOREIGN PATENTS 10,045   10/1901   Great Britain.

ERNEST R. PURSER, Primary Examiner

U.S. Cl. X.R.

299—56, 86